US006521319B1

(12) United States Patent
Aulick et al.

(10) Patent No.: US 6,521,319 B1
(45) Date of Patent: Feb. 18, 2003

(54) ASSEMBLY FOR CLEANING TONER RESIN FROM A PRINTING DEVICE AND METHOD

(75) Inventors: Larry Oral Aulick, Cynthiana, KY (US); George Nicholas Powers, Bardstown, KY (US); Mark Stephen Weisman, Jr., Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/631,765

(22) Filed: Aug. 3, 2000

Related U.S. Application Data

(62) Division of application No. 09/058,395, filed on Apr. 9, 1998, now Pat. No. 6,165,280.

(60) Provisional application No. 60/061,384, filed on Oct. 7, 1997.

(51) Int. Cl.[7] .............................. B32B 5/00; B32B 7/00

(52) U.S. Cl. ........................ 428/98; 428/189; 428/36.5; 428/305.5; 15/104.93; 15/210.1; 15/256.5

(58) Field of Search ......................... 428/36.5, 98, 189, 428/305.5; 15/256.5, 104.93, 210.1

(56) References Cited

U.S. PATENT DOCUMENTS 3,977,898 A * 8/1976 Hwa ............................. 134/6
3,980,424 A * 9/1976 Latone ........................ 432/75
4,007,983 A * 2/1977 Knieser ....................... 355/15
4,016,812 A * 4/1977 Lauk et al. ................. 101/425
4,184,279 A * 1/1980 Peilet .......................... 40/314
4,185,140 A * 1/1980 Strella et al. ............... 428/418
4,230,406 A * 10/1980 Klett ........................... 355/15
4,364,660 A * 12/1982 Oda ............................ 355/15
4,470,694 A * 9/1984 Murakami et al. ............ 355/15
4,501,620 A * 2/1985 Oda ............................. 134/6
4,640,608 A * 2/1987 Higaya et al. ................ 355/15
5,480,493 A * 1/1996 Harry, Jr. ....................... 134/4
5,880,244 A * 3/1999 Dowlen et al. ............... 528/15
5,952,442 A * 9/1999 Dowlen et al. ............... 528/15

FOREIGN PATENT DOCUMENTS

GB 1330227 * 9/1973

* cited by examiner

*Primary Examiner*—Harold Pyon
*Assistant Examiner*—Marc Patterson
(74) *Attorney, Agent, or Firm*—John A. Brady

(57) ABSTRACT

An assembly is provided for cleaning toner resin from the operating parts of a printing device. The assembly comprises a porous member impregnated with a silicone copolymer and a rigid member with a supporting base to mount said porous member. The assembly is preferably a two-part kit having a brush member for wiping components of the printing device and a pad member mountable for stationary positioning within said printing device for scrubbing components of the printing device as they move relative to the mounted pad. The silicone copolymer has the formula

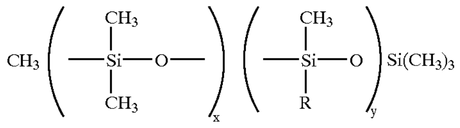

where x represents from about 98.8 molar percent to about 99.5 molar percent, y represents from about 0.5 molar percent to 1.2 molar percent and R comprises from about 70% by weight to about 100% by weight of a $C_{15}$–$C_{60}$ alkyl group and from about 0% by weight to about 30% by weight of a $C_2$–$C_{14}$ alkyl group.

20 Claims, 2 Drawing Sheets

ASSEMBLY FOR CLEANING TONER RESIN FROM A PRINTING DEVICE AND METHOD

This application is a division of U.S. Application Ser. No. 09/058,395, Aulick et al., filed Apr. 9, 1998, now U.S Pat. No. 6,165,280, which claims the benefit of U.S. Provisional Application No. 60/061,384, filed Oct. 7, 1997.

TECHNICAL FIELD

The present invention generally relates to electrophotographic printing, and more particularly, to an assembly and method for cleaning toner resin from the components of a printing device.

BACKGROUND OF THE INVENTION

Electrophotography is a process whereby the light image of an original representation to be copied is usually recorded in the form of a latent electrostatic image upon a photosensitive member of a printing device. The latent electrostatic image is subsequently rendered visible by application of electroscopic marking particles, known in the art as toner. The visible toner image can be either fixed directly on the photosensitive member or transferred from the photosensitive member to another support, such as a sheet of paper, with a subsequent fixing of the image thereto.

The toner is a thermoplastic resin compound and is contained in a cartridge in such printing devices as laser printers and photocopiers. The cartridge is a replaceable supply item for these printing devices. The toner is held in a reservoir in the cartridge and then transferred onto a developer roll in the printing device. The toner is then transferred onto a photoconductor in a pattern corresponding to the image to be printed. This procedure is based on a charge distribution created on the photoconductor surface.

A common problem associated with printing devices is the leakage of toner resin from the toner cartridge and/or the developer roll. Certain printing devices have multiple toner cartridges, thus multiplying the opportunity for toner resin leakage. Over time, the components of the printing device, particularly the paper-feed assembly within the device, can accumulate a significant amount of toner resin. This leads to poor print image quality, as well as the soiling of a user's hands and clothes and contamination of the environment around the printing device.

Accordingly, there has been an on-going need to find ways to clean the accumulated toner resin leaked to the components of the printing device. Several cleaning systems have been designed in an attempt to provide a solution to the identified need. However, the procedures used to date are, in general, costly, require a maintenance call, which can be frustrating due to inherent delays, and/or fail to remove a sufficient amount of toner resin to be successfully efficient.

SUMMARY OF THE INVENTION

It is a primary object of the present invention to provide an assembly for cleaning toner resin from the components of a printing device that is provided in a kit to users of the printing device.

It is an additional object of the present invention to provide a two-part assembly for cleaning toner resin from the components of a printing device wherein a brush is manually used to wipe certain exposed components and a pad is mountable within the printing device to scrub certain inaccessible components as they move relative to the stationary pad.

It is still another object of the present invention to provide an assembly for cleaning toner resin from the components of a printing device in order to substantially eliminate print defects associated with the accumulation of toner resin leaked from the toner cartridge and/or developer roll.

Another object of the present invention is to provide an assembly for cleaning toner resin from the components of a printing device whereby a porous member is impregnated with a compound that has a strong affinity for toner resin particles.

It is a further object of the present invention to provide an assembly for cleaning toner resin from the components of a printing device that utilizes a silicone copolymer that has the consistency of a paste for attracting and holding toner resin particles upon contact therewith.

It is an additional object of the present invention to provide a method of cleaning toner resin from the components of a printing device using a two-part kit wherein each part is adaptable to abrade the components of the printing device without inflicting damage while attracting and capturing noncontained toner resin particles within the impregnated porous material.

Still another object of the present invention is to provide a method of cleaning toner resin from the components of a printing device that is inexpensive, user-friendly and effective for its purpose.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purpose of the present invention as described herein, a novel assembly and method for cleaning toner resin from the components of a printing device is disclosed. Testing of this assembly, as used according to the inventive method, has shown dramatic decreases, and in some cases, elimination of the print defects normally associated with leaked toner resin. The assembly is inexpensively made, easy to use and has proven the best means known to date to effectively remove toner resin from the components of a printing device.

In its broadest aspects, the assembly comprises a porous member impregnated with a silicone copolymer paste and a rigid member with a supporting base on which the porous member is mounted. A commercial embodiment of the invention takes the form of a two-part kit, wherein a first porous member is mounted to the supporting base of the first rigid member and a second porous member is mounted to the supporting base of a second rigid member.

In the preferred embodiment, the first porous member is substantially coextensive with the first rigid member in a lengthwise direction. A tab, and preferably a plurality of spaced tabs, extends from a first longitudinal side of the first rigid member. Each tab is cut along a line at its junction with the first longitudinal side of the rigid member and scored at the inner end of the cut so as to allow folding of the tab for operative positioning.

In preferred inventive kit, the second porous member extends from a first terminal edge of the second rigid member to a point intermediate along the lengthwise dimension of the second rigid member. The first and second porous members are preferably a low density polyether urethane foam.

In one of the key aspects of the inventive assembly, the silicone copolymer paste has the general formula

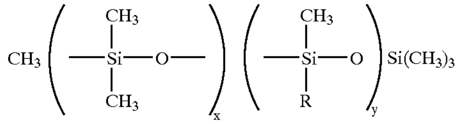

wherein x represents from about 98.8 molar percent to about 99.5 molar percent, y represents from about 0.5 molar percent to about 1.2 molar percent, and R comprises from about 70% by weight to about 100% by weight of a $C_{15}$–$C_{60}$ alkyl group and from about 0% by weight to about 30% by weight of a $C_2$–$C_{14}$ alkyl group. With respect to the copolymer moieties, x represents preferably from about 99.0 molar percent to about 99.2 molar percent and y represents preferably from about 0.8 molar percent to about 1.2 molar percent. Most preferably, x represents about 99.0 molar percent and y represents about 1.0 molar percent.

With respect to the R group in the second silicone polymer moiety, the $C_2$–$C_{14}$ alkyl group is preferably a hexyl group. Furthermore, the $C_{15}$–$C_{60}$ alkyl group is preferably a $C_{30}$–$C_{45}$ alkyl group. Most preferably again, the $C_{30}$–$C_{45}$ alkyl group is a $C_{36}$ alkyl group. In the inventive assembly, either of the $C_{15}$–$C_{60}$ alkyl group and the $C_2$–$C_{14}$ alkyl group may be halogenated, the most preferable halogen (if present) being fluorine.

The silicone copolymer in its broadest aspects has a molecular weight (weight average) in the range of from about 80,000 to about 250,000. The molecular weight is more preferably in the range from about 80,000 to about 150,000. Most preferably, the molecular weight of the silicone copolymer is about 110,000. The inventive assembly also contemplates that the silicone copolymer has a viscosity in the range from about 3000 centipoise to about 7000 centipoise at 93° C.

The inventive method for cleaning toner resin from the components of a printing device contemplates the use of the porous member described in its broadest aspects in a manner to attract and remove noncontained toner resin. More specifically, the method is broadly performed by opening the cover of the printing device and abrading the components with the porous member. With the preferred embodiment of the two-part kit, the abrading step comprises the steps of mounting the first porous member within the printing device for stationary positioning. Subsequently, the printing device is initiated for customary motion of the internal components. Interference contact occurs during relative movement between operating components and the stationary porous member. This results in a scrubbing action by the first porous member of the inaccessible movable components within the printing device. Alternatively and/or additionally, the abrading step is performed by wiping the second porous member across exposed surfaces within the printing device.

Still other objects of the present invention will become apparent to those skilled in this art from the following description wherein there is shown and described a preferred embodiment of the invention, simply by way of illustration of one of the modes best suited to carry out the invention. As will be realized, the invention is capable of other different embodiments and its several details are capable of modification in various obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing.

Figure 1:
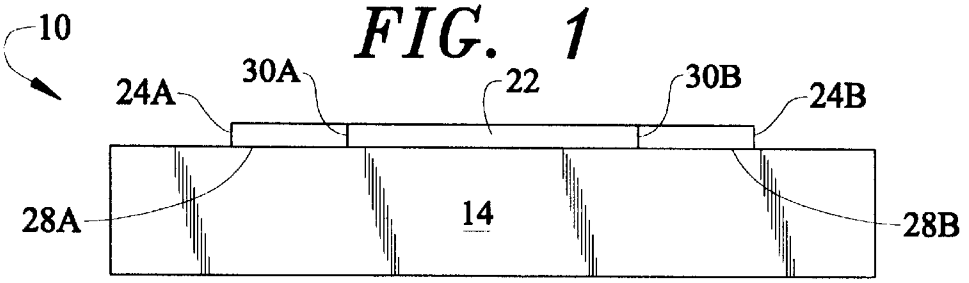
FIG. 1 is the bottom view of the foam pad of the present invention, showing the porous foam member.

Reference will now be made in detail to the present preferred embodiment of the invention, an example of which is illustrated in the accompanying drawing.

DETAILED DESCRIPTION OF THE INVENTION

An inventive cleaning assembly is disclosed as preferably comprising a two-part kit including a pad 10 and a brush 12 that are cooperatively used to remove toner resin from components of a printing device. A method of using the assembly to clean toner resin from a printing device is also disclosed. The assembly and its associated method of use facilitate an inexpensive, easy-to-use and effective means for cleaning toner resin from the components of a printing device on which the resin is deposited as a result of unwanted leakage. Since toner leakage is a constant problem, the inventive assembly and the associated method are contemplated for repeated periodic maintenance procedures.

The pad 10 of the inventive assembly comprises a porous member mounted to the support backing of a rigid member. In the preferred embodiment, the porous member is a low density polyether urethane foam (hereinafter referred to as the pad foam member 14). The rigid member is preferably formed of cardboard (hereinafter referred to as the pad support member 16), to which the pad foam member is adhesively attached. It has been found that the pad foam member 14 achieves its described cleaning goal with an operation thickness of three quarters of an inch (¾").

The brush 12 is similarly provided with a porous member mounted to the support backing of a rigid member. Preferably, the porous member is the same type of low density polyether urethane foam as used with the pad 10. The porous member of the brush 12 is hereinafter referred to as the brush foam member 18. Like with the pad 10 described above, the rigid member of the brush 12 is defined by a cardboard strip to which the brush foam member 18 is adhesively attached. The rigid member of the brush 12 is hereinafter referred to as the brush handle 20. It has been determined that a brush foam member 18 thickness of one quarter inch (¼") serves to permit the brush 12 to effectively perform its cleaning function.

The foam for both the pad foam member 14 and the brush foam member 18 preferably has a pore size of 60 to 70 pores per inch. The foam also has a density of 30 kilograms per cubic meter UL 94 HF-1 and may be purchased under the trade designation 9410L773 from PSC Fabricating of Louisville, Ky.

The rigidity of the pad support member 16 and the brush handle 20 has been determined to be sufficient with the use of cardboard having a thickness of one eighth inch (1/8"). The cardboard may also be purchased from PSC Fabricating and cut to the design shown in the drawing figures.

Figure 2:
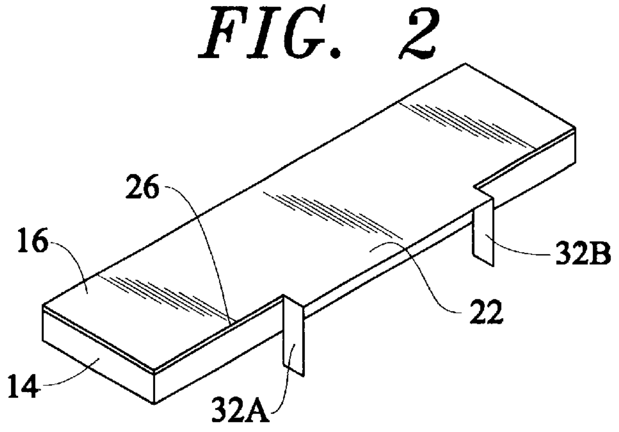
FIG. 2 is a perspective view of the foam pad of the present invention.
Figure 3:
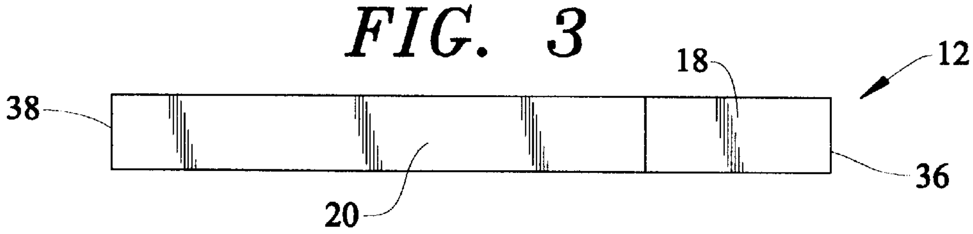
FIG. 3 is a top view of the foam brush of the present invention.
Figure 4:
FIG. 4 is a side view of the foam brush of the present invention.

Referring again to the pad 10, the pad foam member 14 is preferably designed to be substantially coextensive with pad support member 16 in the lengthwise direction, as best seen in FIG. 2 of the drawing figures. A flange 22 having terminal edges 24A, 24B projects from one longitudinal edge 26 of the pad support member 16. The flange 22 is formed with cuts 28A, 28B from each of the terminal edges 24A, 24B and ending at opposed intermediate points along the flange. The cuts 28A, 28B are made along a line at the junction between the flange 22 and the longitudinal edge 26 of the pad support member 16. Score lines 30A, 30B are provided on the underside of the flange 22 at the inner ending points of the opposing cuts 28A, 28B. The cuts 28A, 28B and the score lines 30A, 30B permit to the opposing outer portions of the flange 22 to be bent (see FIGS. 2 and 6) to create tabs 32A, 32B that are appropriately slid into slots 34 within the printing device 35 so that the pad 10 may perform its cleaning function.

The brush 12 is formed such that the brush foam member 18 is mounted to a first terminal end 36 of the brush handle 20. The brush foam member 18 preferably extends along approximately one quarter (1/4) of the distance from the first terminal end 36 toward a second terminal end 38. This allows the user to clutch the brush handle 20 adjacent the second terminal end 38 for manual use of the brush 12.

In a key aspect of the preferred embodiment of the invention, the pad foam member 14 and the brush foam member 18 are both impregnated with a compound that has been shown to have a strong affinity, and an unexpectedly high capacity, for toner resin. Importantly, this impregnating compound has a paste or caulk-like consistency. This preferred impregnating compound is a random copolymer of polydimethylsiloxane and a single alkyl substituted polydimethylsiloxane.

The silicone copolymer has the following formula:

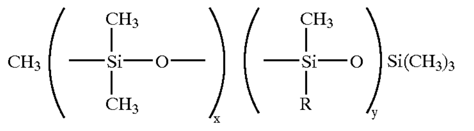

wherein x represents from about 98.8 molar percent to about 99.5 molar percent, y represents from about 0.5 molar percent to about 1.2 molar percent, and R comprises from about 70% by weight to about 100% by weight of a $C_{15}$–$C_{60}$ alkyl group and from about 0% by weight to about 30% by weight of a $C_2$–$C_{14}$ alkyl group. In this formula, x is preferably from about 99.0 molar percent to about 99.2 molar percent and is most preferably about 99.0 molar percent. With respect to the single alkyl substituted polydimethylsiloxane moiety, y is preferably from about 0.8 molar percent to about 1.0 molar percent and most preferably about 1.0 molar percent.

With respect to the substituted alkyl, it is preferred that the major component of R be a $C_{30}$–$C_{45}$ alkyl and most preferably a $C_{36}$ alkyl (triaconyl). It is also preferred that the $C_2$–$C_{14}$ alkyl be a $C_6$ alkyl (hexyl). The molecular weight (weight average) of the copolymer is preferably from about 80,000 to about 250,000. More preferably, the molecular weight falls in the range of about 80,000 to about 150,000, and is most preferably about 110,000. In accordance with the existence of paste consistency, the compound preferably has a viscosity of from about 3000 centipoise to about 7000 centipoise at about 93° C. It is also desired that the silicone copolymer be heat stable, which in this instance means that the compound can be held at 210° C. for three months with no significant change in color, odor, viscosity or molecular weight.

Those skilled in the art recognize that the viscosity of the silicone copolymer may be adjusted in several ways to make sure it falls within the required range. Adjustment methods include the use of a chainstopper, or controlling the level of crosslinking of the copolymer while it is being formed. Alternatively, one or more viscosity control agents may be added to the formulation. When used, these agents generally comprise from about 0.5% by weight to about 30% by weight of the composition. Preferably the agents in the composition comprise from about 10% by weight to about 25% by weight and, most preferably, about 20% by weight of the composition. As is known, the particular agent selected may be for the purpose of increasing the viscosity or decreasing the viscosity. Useful viscosity altering agents include amorphous (fumed) silica (especially amorphous silica having a hexamethyldisiloxane surface treatment), silicone oil and mixtures thereof. The preferred viscosity control agent is silicone oil, 30,000 centistoke.

The overall stability of the composition is also very important for the use of the impregnating compound. Thus, an antioxidant may be added to the composition so as to eliminate any odor, decomposition and crosslinking compositions which may occur. When used, the antioxidant generally comprises from about 3% by weight to about 20% by weight of the composition. Preferably, the antioxidant comprises from about 5% by weight to about 13% by weight and, most preferably, about 9% by weight of the composition. Mixtures of antioxidants which operate by differing mechanisms are preferred. Examples of such useful antioxidants include the following classes of materials:

(a) free radical scavengers—such as hindered phenols, (b) phosphite materials; and (c) hydroperoxide decomposers—such as thiodipropionate materials; and (d) mixtures of the foregoing.

A particularly preferred antioxidant mixture includes Irganox 1010 (a hindered phenol-type antioxidant, commercially available from Ciba Geigy), Cyanox STDP (distearylthiodipropionate, commercially available from Cytek Industries), and Mark 2112 (a high temperature phosphite antioxidant, commercially available from Witco Corp.).

The silicone copolymer may be synthesized by any method known in the art. The steps generally include the copolymerization of the cyclic siloxane (referred to as D4) and the silicone hydride components to form a silicone prepolymer, and then grafting the long chain alkene group onto that prepolymer.

EXAMPLE

Step 1

In a 1000 mL four-necked round bottom flask equipped with a thermometer, condenser, mechanical stirrer and septum, add 213.05 g of D4, 1.93 g of polyymethylhydrosiloxane (PMHS), 0.62 g of dried bentonite (F-20X at 100° C. for four hours), and 0.744 g of hexamethyldisiloxane (HMDS), making a volume of 967 $\mu$L. Fill the reaction flask with nitrogen. Slowly heat the mixture to 90° C. with 500 RPM stirring. Hold the mixture at 90° C. for 18 hours. To remove any unreacted D4, heat the mixture under high vacuum at 125° C. The viscosity of the material will reach 5000 centipoise. The content of the hydride is measured by proton NMR and is about 1 molar percent.

Step 2

Cool the reaction flask from step 1 to room temperature. Then add 26.5 g of triacontene (e.g. Gulftene 30+, commercially available from Chevron, a mixture of alkene materials having alpha-olefin content greater than 60% and an average chain length of about 36) and 400 mL of toluene (dried with molecular sieves). Fill the reaction mixture with nitrogen. Heat to 75° C., measure IR of a solution aliquot, and add 50 $\mu$L of PC072 (Platinum, 1,3-diethenyl-1,1,3,3-tetramethyldisiloxane complex), using this measurement to designate time=0. At 20 minutes, add 50 $\mu$L of PC072 and measure IR. Continue to add 50 $\mu$L every 20 minutes, taking IR of an aliquot until percent. hydride (%H) reaches 25–30% of original (time=0) hydride integration from 1R (no less than 40 minutes addition; nor more than 60 minutes addition). When the % hydride reaches 25–30%, add 50 mL of hexene and 50 $\mu$L of PC072, using this addition to designate quench time=0. At 30 minutes, add another 50 $\mu$L of PC072. Continue monitoring IR until the % hydride is below 10% of original hydride integration (normally 1 hour).

Optional Step 3 (Addition of Antioxidant)

From step 2, add 3% Cyanox STDP, 0.6% Irganox 1010 and 0.9% Mark 2112 antioxidants based on amount silicone copolymer paste (if assumed 214.3 g paste produced: 7.24 g STDP, 1.45 g 1010 and 2.17 g 2112). Heat at 100° C. and stir until mixed (approximately one hour). Pour into an oven dish and dry overnight in an explosion-proof oven at approximately 75° C.

The procedure for impregnating the polyether urethane foam with the silicone copolymer is preferably as follows:

The operative silicone copolymer is dissolved in toluene in relative amounts of 10% by weight silicone copolymer and 90% by weight toluene. Ten grams of the toluene/silicone copolymer solution is transferred to a pan of similar dimension to the foam being impregnated. The foam is dipped into the solution and allowed to equilibrate until greater than 90% of the solution has migrated into the foam. The foam is then inverted, with the coated side facing up, and then placed in an explosion-proof oven set to 80° C. The foam is removed after 30 minutes. The total weight increase of the foam after removal of the toluene is to be between 0.9 g and 1.0 g. If any further odor of toluene is detected, the foam is to be placed into the oven for an additional 30 minutes and rechecked.

The inventive method of cleaning toner resin from the components of a printing device involves the use of the above-described assembly. The two parts of the assembly are cooperatively used to abrade the appropriate surfaces of the printing device components in the toner resin removal effort.

Figure 5:
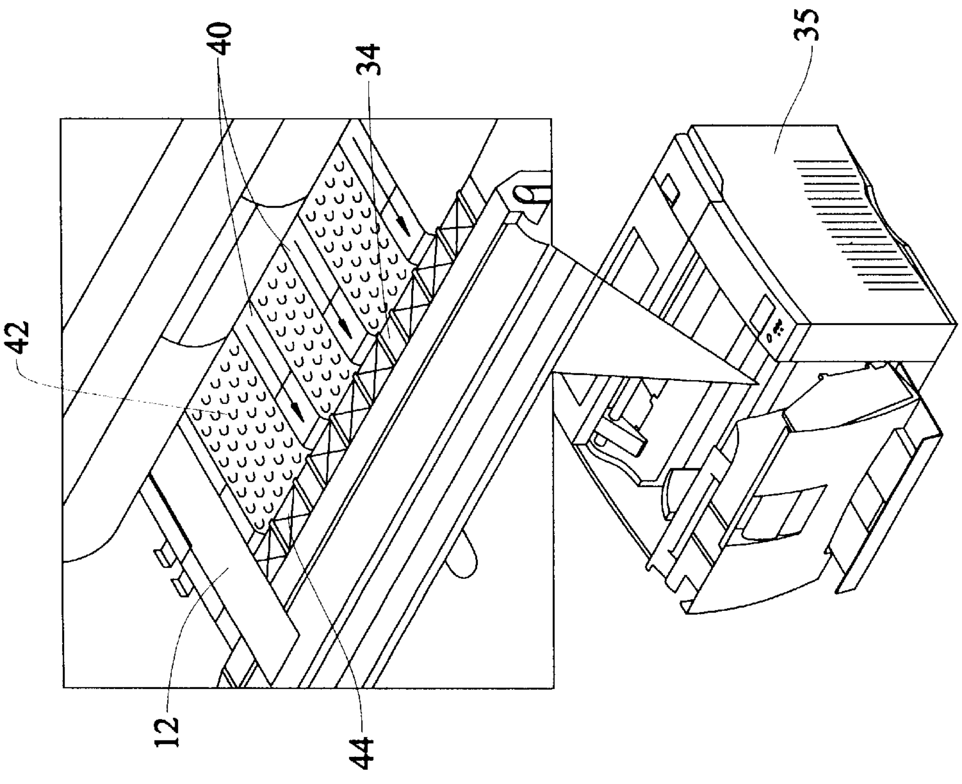
FIG. 5 is a perspective view of the foam brush being used to wipe toner resin from exposed surfaces within a printing device.

The brush 12 is simply employed to wipe toner resin from exposed surfaces of the printing device components. The compressible nature of the brush foam member 18 permits the user to clean in hard-to-reach areas with narrow openings. The rigid brush handle 20 is easily gripped for manual manipulation of the brush 12 in order to clean the exposed and semi-exposed areas reachable thereby. FIG. 5 illustrates the brush 12 being manually manipulated to wipe toner resin from a track 40 of the printer belt 42. Other areas conductive to cleaning by the brush 12 include the back of the transfer unit and other exposed metal surfaces within the printing device.

The pad 10 is preferably used to clean toner resin from those places and/or components of the printing device that are not readily accessible. More particularly, it is common in laser printers for toner resin to leak onto the printer belt 42. This is an endless belt 42 that makes continuous passes carrying paper through the print engine for printing. Within the confines of the printing device, a portion of the printer belt is on its underneath run of its continuous path and thus cannot be reached in the ordinary course.

Figure 6:
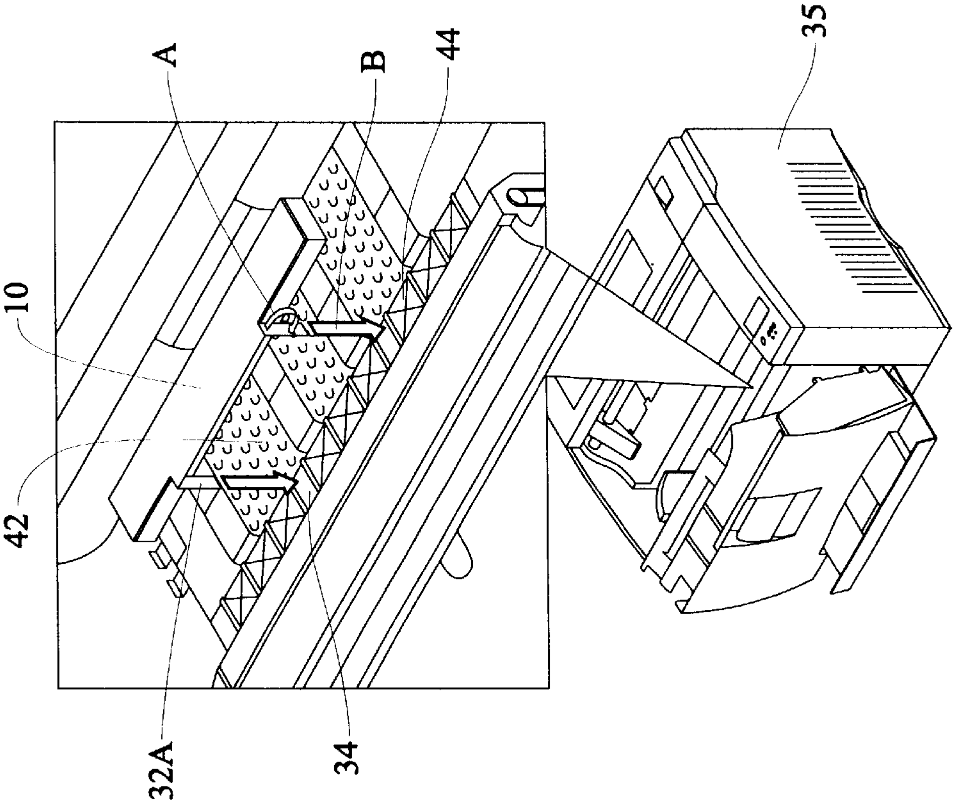
FIG. 6 is a perspective view of the foam pad being positioned within a printing device for operative use.

The pad 10 is designed to be used in the inventive method to clean the printer belt 42. As shown in FIG. 6, the pad 10 is mounted within the printing device 35 for stationary positioning. More specifically, the tabs 32A, 32B are folded in accordance with action arrow A. The pad 10 is then directed according to action arrows B so that the tabs 32A, 32B are firmly received into the slots 34 on the shelf 44. The printing device 35 is then closed in preparation for operation. This action compresses the pad foam member 14, urging the pad foam member against the belt 42. The closing of the printing device 35 also initiates a density check, during which the belt 42 turns. The belt 42 continues to turn until the printing device reaches a steady-state condition and, all the while, the pad foam member 14 is scrubbing the belt 42 as it passes across. This effects a removal of toner resin from the belt 42.

In summary, the inventive cleaning assembly and its use in the associated method for cleaning toner resin from components of a printing device provide significant improvements in effectiveness and cost/use efficiency over the prior art. The pad 10/brush 12 kit assembly is useful for an infinite array of printing devices. The silicone copolymer paste that is impregnated into the pad foam member 14 and the brush foam member 18 has proven to be significantly better at both attracting and holding toner resin within its pores, and thus facilitating the cleaning function. Testing has shown that the invention functions effectively with standard toners made of styrene acrylic resins, as well as other particular resins, such as poly(dipropoxylated bisphenol-A fumarate). Furthermore, the silicone copolymer paste is compatible with oils and waxes used in many fuser systems. Therefore, there is minimal chance for residual impregnating compound to cause problems with the electophotographic process.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance to which they are fairly, legally and equitable entitled.

What is claimed is:

1. An assembly for cleaning a toner resin from components of a printing device, comprising:

a porous member impregnated with a paste comprising a silicone copolymer; and a rigid member with a supporting base on which said porous member is mounted.

2. The assembly as in claim 1, wherein said silicone copolymer has a polydimethylsiloxane moiety and an alkyl substituted polydimethylsiloxane moiety.

3. The assembly as in claim 1, wherein said porous member extends from a first terminal end of said rigid member to a point intermediate along the lengthwise dimension of said rigid member.

4. The assembly as in claim 1, wherein said porous member is a polyether urethane foam.

5. The assembly as in claim 1, wherein the molecular weight of said silicone copolymer is in an amount of about 80,000 to about 250,000 weight average.

6. The assembly as in claim 1, wherein the molecular weight of said silicone copolymer is in an amount of about 80,000 to about 150,000 weight average.

7. The assembly as in claim 1, wherein the molecular weight of said silicone copolymer is about 110,000 weight average.

8. The assembly as in claim 1, wherein said silicone copolymer has a viscosity in an amount of about 3000 centipoise to about 7000 centipoise at a temperature of about 93° C.

9. The assembly as in claim 1, wherein said silicone copolymer has the formula

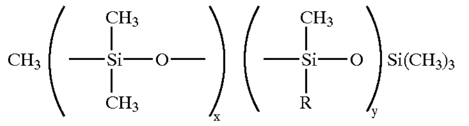

wherein x represents from about 98.8 molar percent to about 99.5 molar percent, y represents from about 0.5 molar percent to about 1.2 molar percent and R comprises from about 70% by weight to about 100% by weight of a $C_{15}$–$C_{60}$ alkyl group and from about 0% by weight to about 30% by weight of a $C_2$–$C_{14}$ alkyl group.

10. The assembly as in claim 9, wherein x represents from about 99.0 molar percent to about 99.2 molar percent and y represents from about 0.8 molar percent to about 1.0 molar percent.

11. The assembly as in claim 9, wherein x represents about 99.0 molar percent and y represents about 1.0 molar percent.

12. The assembly as in claim 9, wherein said $C_2$–$C_{14}$ alkyl group is a hexyl group.

13. The assembly as in claimed 9, wherein said $C_{15}$–$C_{60}$ alkyl group is a $C_{30}$–$C_{45}$ alkyl group.

14. The assembly as in claim 9, wherein said $C_{15}$–$C_{60}$ alkyl group is a $C_{36}$ alkyl group.

15. The assembly as in claim 9, wherein either of said $C_{15}$–$C_{60}$ alkyl group and said $C_2$–$C_{14}$ alkyl group is halogenated.

16. The assembly as in claim 9, wherein either of said $C_{15}$–$C_{60}$ alkyl group and said $C_2$–$C_{14}$ alkyl group is fluorinated.

17. The assembly as in claim 1, wherein said porous member is substantially coextensive with said rigid member, in a lengthwise direction.

18. The assembly as in claim 17, wherein said rigid member comprises two foldable tabs extending from a first longitudinal side.

19. The assembly as in claim 18, wherein each said tab is cut along a line at its junction with said first longitudinal side of said rigid member so as to facilitate folding to an operative position.

20. The assembly as in claim 18, wherein each said tab is scored at an inner end of said cut so as to facilitate folding to an operative position.

* * * * *